Figure 1:
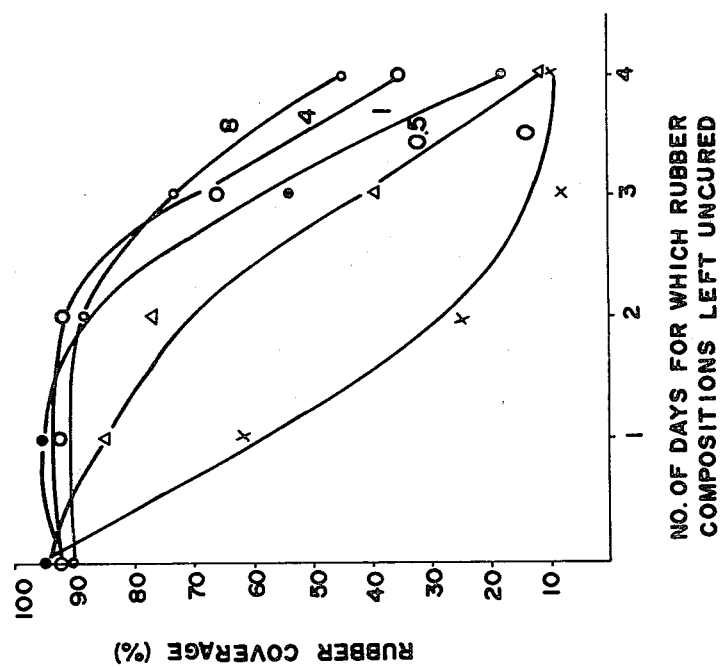

United States Patent [19]

Kawakami et al.

[11] 4,384,027
[45] May 17, 1983

[54] COMPOSITES OF STEEL CORDS AND RUBBER

[75] Inventors: Shinji Kawakami, Hiratsuka; Yasuhiro Ishikawa, Yokohama, both of Japan

[73] Assignee: The Yokohama Rubber Co., Ltd., Tokyo, Japan

[21] Appl. No.: 370,211

[22] Filed: Apr. 20, 1982

[30] Foreign Application Priority Data

Apr. 30, 1981 [JP] Japan ................... 56/64113

[51] Int. Cl.$^3$ ............... C23F 7/12; B60C 9/16
[52] U.S. Cl. .................... 428/624; 428/625; 428/623; 428/462; 528/129; 528/143; 156/110 A
[58] Field of Search ............. 428/623, 624, 625, 462; 528/129, 143; 156/110 A

[56] References Cited

U.S. PATENT DOCUMENTS

| | | |
|---|---|---|
| 2,840,542 | 6/1958 | Freeman et al. .............. 528/129 |
| 2,999,081 | 9/1961 | Stivers ........................ 528/129 |
| 3,026,586 | 3/1962 | Neuworth .................... 528/129 |
| 3,955,033 | 5/1976 | Elmer ........................... 524/511 |
| 3,981,760 | 9/1976 | Elmer ........................... 156/110 A |
| 4,073,776 | 2/1978 | Galkiewicz et al. ........... 528/129 |
| 4,073,826 | 2/1978 | Galkiewicz et al. ........... 528/129 |
| 4,182,639 | 1/1980 | Pignocco et al. .............. 428/625 |
| 4,218,517 | 8/1980 | Van Ooij ....................... 428/625 |
| 4,255,496 | 3/1981 | Haemers ....................... 428/625 |
| 4,297,159 | 10/1981 | Dobins et al. ................. 428/625 |

Primary Examiner—Veronica O'Keefe
Attorney, Agent, or Firm—Jordan and Hamburg

[57] ABSTRACT

A composite comprising a steel cords-covering rubber composition and a rubber composition which is contiguous thereto and contains a thiazole type vulcanization accelerator, at least one of these rubber compositions containing a m-cresol resin whereby they can be cured without decreasing the resulting strength of bond therebetween even after they have been left uncured in contact with each other for a considerable time.

5 Claims, 2 Drawing Figures

COMPOSITES OF STEEL CORDS AND RUBBER

This invention relates to a composite for tires, comprising steel cords and rubber composed of a rubber layer directly covering the steel cords and a rubber layer contiguous to said steel cords-covering rubber layer. More particularly it relates to such a composite comprising a steel cords-covering rubber layer and a thiazole type vulcanization accelerator-containing rubber layer contiguous thereto, at least one of these rubber layers having been incorporated with a meta-cresol resin thereby to prevent the degradation of a bond or adhesion of the steel cords to the rubber layers even when cured after these uncured rubber layers have been left in contact with each other.

Various different rubbers are usually used in combination in the production of automobile tires since the tires are required to have various functions. Thus, depending on the purpose for which tires to be made are used, the resulting tires will widely vary in properties at the various parts thereof. For example, the portion, such as the cap tread, of tires which contacts with road surfaces, is made so that it has satisfactory wear resistance, chipping resistance and the like, while the side treads of the tires are made so that they have satisfactory ozone crack resistance, weatherproofness and the like. Further, in the production of steel reinforced tires using steel cords in the belt and carcass portions thereof, organic acid salts of cobalt, HRH (hexamethylenetetramine, resorcine and silica used in combination) type additives and other specific additives are used in many cases to improve a bond between the steel cords and the rubber since the adhesiveness of the steel cords-covering rubber to the steel cords is an important factor.

In cases where dibenzothiazyl disulfide (MBTS) which is a thiazole type vulcanization accelerator in a narrow sense is used in the preparation of a rubber composition, the resulting rubber composition will give a cured rubber having excellent tensile strength, elongation and other rupture properties, and aging resistance. From this point of view, it can be said that thiazole type vulcanization accelerators are advantageous over sulphenamide type and thiuram type vulcanization accelerators as those used in the preparation of rubber compositions for cap treads and side treads. In fact, thiazole type vulcanization accelerators have heretofore been used alone or in combination with other vulcanization accelerators to meet other requirements in the preparation of rubber compositions for cap treads and side treads.

However, in cases where a steel cords (such as steel belt and steel carcass)-covering rubber layer (hereinafter sometimes referred to as "rubber (A)" or "rubber layer (A)") and a thiazole type vulcanization accelerator-containing rubber layer (hereinafter sometimes referred to as "rubber (B)" or "rubber layer (B)") contiguous to the layer (A) are used in the production of steel reinforced tires, a post-cure bond between the rubber layer (A) and the steel cords will be weak. Therefore, it is not suitable to use a thiazole type vulcanization accelerator in the neighborhood of the steel cords-covering rubber layer of rubber compositions for steel reinforced tires. Since a rubber composition for a cap tread and that for side treads are contiguous to a steel cords-covering rubber composition in many cases, it is unsuitable to use a thiazole type vulcanization accelerator in the preparation of rubber compositions for these threads. If rubber compositions for the cap and side treads contain a thiazole type vulcanization accelerator and are left uncured for a few days particularly after building of the rubber compositions into uncured tires, a bond between the steel cords and the rubber becomes very weak after the rubber compositions are cured. In other words, if the steel cords-covering rubber layer (rubber layer (A)) and the thiazole type vulcanization accelerator-containing rubber layer (rubber layer (B)) are left uncured in contact with each other, a bond between the steel cords and the rubber (A) will be weak when cured even after they are left in the above manner for a short period of time.

Steel cords for steel reinforced tires are those which are usually plated on the surface with brass (copper-zinc alloy) or the like, and the copper in the brass plate on the steel cords will react with the sulfur in the rubber (A) to effect a bond between the steel cords and the rubber. However, in cases where a rubber contiguous to the rubber (A) contains a thiazole type vulcanization accelerator, both the moisture absorbed by the rubber (A) from the air and the portion of the thiazole type vulcanization accelerator diffused into the rubber (A) will hinder a bond between the cords and the rubber from being effected. Such hindrance will not take place in cases where a rubber contiguous to the rubber (A) contains a sulfenamide type vulcanization accelerator and, thus, thiazole type vulcanization accelerators are very disadvantageous in that they will cause such hindrance.

The primary object of this invention is to provide a composition comprising steel cords and rubber composed of a steel cords-covering rubber layer and a thiazole type vulcanization accelerator-containing rubber layer, the composite, when cured, will give satisfactory steel reinforced tires composed of a cured rubber layer securely bonded to the steel cords and a cured thiazole type vulcanization accelerator-containing rubber layer having excellent rupture resistance, aging resistance and like properties and bonded securely to said steel cords-bonded rubber layer, without a decrease in strength of bond between the steel cords and the rubber due to the fact that the steel cords-covering rubber layer and the thiazole type vulcanization accelerator-containing rubber layer were left uncured in contact with each other prior to being cured.

As a result of their intensive studies in an attempt to attain the aforesaid object of this invention, the present inventors have found that the object may be achieved by adding a certain amount of a meta-cresol resin to at least one of the steel cords-covering rubber layer and the thiazole type vulcanization accelerator-containing rubber layer whereby when cured, the steel cords and the cords-covering rubber layer are bonded to each other without a decrease in strength of bond therebetween in spite of the presence of the thiazole type vulcanization accelerator-containing rubber layer contiguous to the cords-covering rubber layer. This invention is based on this finding or discovery.

The composite of this invention comprising the steel cords-covering rubber layer (rubber layer (A)) and the thiazole type vulcanization accelerator-containing rubber layer (rubber layer (B)), is characterized in that the rubber layer (B) comprises 100 parts by weight of rubber and 0.05-2.0 parts by weight of a thiazole type vulcanization accelerator, and at least one of the rubber layers (A) and (B) contains 0.5-10 parts by weight of a meta-cresol resin per 100 parts by weight of rubber.

The rubber compositions used as material for the rubber layers (A) and (B) are those usually used as material for the tread or carcass portion of tires and include general-purpose rubbers such as natural rubber and synthetic diene rubbers. Further, they further contain suitable amounts of carbon black, zinc oxide, stearic acid, antioxidant, sulfur and other additives, which are usually used in the rubber industrial field. Particularly, in the preparation of the steel cords-covering rubber layer (A), it is required that the rubber composition for the layer (A) will exhibit a satisfactory bond to the steel cords when cured. For the purpose, the rubber composition may contain a cobalt salt of organic acid, a HRH system and the like which are usually used in the rubber industry.

In addition, the steel cords used in this invention are those which are usually plated with brass, copper, a zinc alloy or the like.

The thiazole type vulcanization accelerators used in the rubber layer (B) are those in the narrow sense and include mercaptobenzothiazole (MBT) and dibenzothiazyl disulfide (MBTS). The rubber layer (B) contains the thiazole type vulcanization accelerator in an amount of 0.05-2.0 parts by weight per 100 parts by weight of the rubber portion of the rubber layer (B). The use of less than 0.05 parts by weight of the vulcanization accelerator will not attain satisfactory vulcanization under feasible curing conditions as shown in Reference Example 2 in Table 1, while the use of more than 2.0 parts by weight thereof will result in the production of a cured product having remarkably decreased tensile resistance and elongation as shown in Reference Example 7, this being not practicable.

The m-cresol resins used in this invention are those prepared by reacting m-cresol with formaldehyde or paraformaldehyde in the presence of an acid catalyst and are a novolak type resin containing bicyclic to hexacyclic structures composed of m-cresol units and having a softening point of 80°-120° C. An example of the resins is a resin produced under the tradename of SUMIKANOL 610 by Sumitomo Chemical Co., Ltd. It is necessary that the m-cresol resin be contained in at least one of the rubber layers (A) and (B). The resin may of course be contained in each of these rubber layers. The amount of the resin contained in the rubber layer or layers totals 0.5-10 parts by weight per 100 parts by weight of rubber material of the rubber layer or layers. The use of less than 0.5 parts by weight of the resin will be little effective thereby causing a decrease in strength of bond between the steel cords and the rubber when the rubber is cured, while the use of more than 10 parts by weight thereof will result in the production of a cured product having remarkably decreased tensile resistance as indicated in Reference Example 12 in Table 2.

Figure 2:
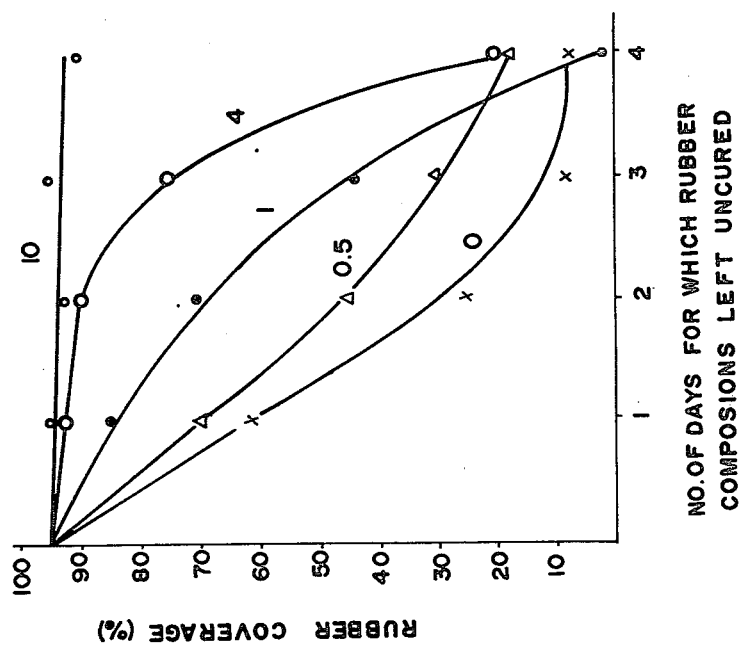

In the accompanying drawing, FIG. 1 is a graph showing the effects of this invention obtained by addition of a m-cresol resin to a steel cords-covering rubber layer and FIG. 2 is a graph showing the effects of this invention obtained by addition of a m-cresol resin to a rubber layer contiguous to said cords-covering rubber layer. In these Figs., the numerals on the graphs indicate the parts by weight of the m-cresol resin per 100 parts by weight of the rubber material.

This invention will be better understood by the following reference examples, control examples, examples and comparative examples.

REFERENCE EXAMPLES 1-7

The rubber material and the additives other than the sulfur and vulcanization accelerator, which are shown in Table 1, were mixed together on a Banbury mixer to form a masterbatch which was then incorporated with the remaining additives shown in Table 1 by the use of an open roll to obtain a rubber composition. The thus obtained rubber compositions were each press cured at 160° C. for 15 minutes. The resulting cured rubber products were tested for their properties in accordance with JIS K 6301. The results are as shown in Table 1.

TABLE 1

| Ingredient (Parts by weight) | Ref. Ex. 1 | Ref. Ex. 2 | Ref. Ex. 3 | Ref. Ex. 4 | Ref. Ex. 5 | Ref. Ex. 6 | Ref. Ex. 7 |
| --- | --- | --- | --- | --- | --- | --- | --- |
| Natural rubber | 60 | | | | | | |
| Polybutadiene rubber | 40 | | | | | | |
| Carbon black (HAF) | 55 | → | → | → | → | → | → |
| Zinc oxide | 3 | | | | | | |
| Antioxidant[1] | 2 | | | | | | |
| Process oil | 3.5 | | | | | | |
| Sulfur | 1.2 | | | | | | |
| Vulcanization accelerator MBTS | | | 0.05 | 0.5 | 1.2 | 2.0 | 2.5 |
| Vulcanization accelerator DZ | 0.6 | | | | | | |
| Properties of cured rubber products | | | | | | | |
| Tensile resistance (Kg/cm$^2$) | 230 | 120 | 200 | 250 | 240 | 210 | 150 |
| 300% modulus (Kg/cm$^2$) | 105 | 60 | 80 | 90 | 100 | 130 | 170 |
| Elongation (%) | 500 | 800 | 650 | 580 | 560 | 500 | 300 |

Note:
Ref. Ex. = Reference Example
[1]N—phenyl-N'—1,3-dimethyl butyl-p-phenylenediamine (produced under the tradename Santflex 13 by Mitsubishi-Monsanto Chemical Co., Ltd.)

As is seen from Table 1, the cured rubber products obtained in Reference Examples 3-6 using 0.05-2.0 parts by weight of MBTS therein exhibit satisfactory properties, while the cured rubber product obtained in Reference Example 7 using 2.5 parts by weight of MBTS therein is inferior in tensile resistance and elongation. The cured rubber product obtained in Reference Example 2 using no vulcanization accelerator therein is inferior in tensile resistance and 300% modulus. Further, the cured rubber product obtained in Reference Example 1 using DZ as the vulcanization accelerator therein is inferior in balancing of properties to those obtained in Reference Examples 3-6.

REFERENCE EXAMPLES 8-12

The ingredients shown in Table 2 were treated in the same manner as in Reference Examples 1-7 to obtain rubber compositions which were then cured and tested for properties. The results are as shown in Table 2.

TABLE 2

| Ingredient (Parts by weight) | Ref. Ex. 8 | Ref. Ex. 9 | Ref. Ex. 10 | Ref. Ex. 11 | Ref. Ex. 12 |
| --- | --- | --- | --- | --- | --- |
| Natural rubber | 100 | | | | |

TABLE 2-continued

| | Ref. Ex. | | | | |
|---|---|---|---|---|---|
| Ingredient (Parts by weight) | Ref. Ex. 8 | Ref. Ex. 9 | Ref. Ex. 10 | Ref. Ex. 11 | Ref. Ex. 12 |
| Carbon black (HAF) | 55 | | | | |
| Zinc oxide | 10 | | | | |
| Stearic acid | 0.5 | → | → | → | → |
| Antioxidant[1] | 1 | | | | |
| Process oil | 2 | | | | |
| Cobalt naphthenate | 2 | | | | |
| Meta-cresol resin | | 0.5 | 5 | 10 | 15 |
| Vulcanization accelerator OBS | 0.6 | → | → | → | → |
| Properties of cured rubber product | | | | | |
| Tensile resistance (Kg/cm$^2$) | 260 | 250 | 240 | 220 | 150 |
| 300% modulus (Kg/cm$^2$) | 145 | 150 | 170 | 160 | 150 |
| Elongation (%) | 370 | 370 | 420 | 450 | 450 |

Note:
Ref. Ex. = Reference Example

As is indicated in Table 2, the cured rubber product obtained in Reference Example 12 using a large amount (15 parts by weight) of the m-cresol resin therein is remarkably inferior in vulcanization resistance to those obtained in Reference Examples 8–11.

EXAMPLES 1–17, CONTROL EXAMPLES 1–2 AND COMPARATIVE EXAMPLES 1–5

In accordance with the formulations indicated in Table 3, the rubber material and the additives other than the sulfur and vulcanization accelerator were mixed together on a Banbury mixer to form a masterbatch which was incorporated with the remaining additives by the use of an open roll to obtain steel cords-covering rubber compositions (Nos. 1–9) and rubber compositions (Nos. 10–20) to be used in contiguity thereto.

1.5 mm thick rubber sheets for bonding to the steel cords were prepared from each of the steel cords-covering rubber compositions. A 5 cm long brass-plated steel cord (1×5 structure; dia. of component wires, 0.25 mm) was buried in the center of the rubber sheet in the thickness direction to obtain a steel cord-buried rubber fabric. The steel cord-buried rubber fabrics so obtained were each covered at each side with a 1.6 mm thick contiguous rubber to obtain test samples. Some of the thus obtained test samples were soon press cured at 160° C. for 20 minutes, while the remaining test samples were press cured under the same conditions as above after they had been left uncured in an atmosphere kept at 30° C. and having a 86% humidity for 1, 2, 3 and 4 days, respectively. The thus cured test samples were each cut in such a manner that the steel cord-covering rubber portion was cut at the point 2 cm away from one end of the buried steel cord without injuring the buried cord. The other end of the buried cord and the rubber portion extending beyond said one end of the buried steel cord were grasped respectively with the chucks of an autograph and pulled in the opposite directions to make a pull-out test. The strength of bond between the steel cord and the rubber was evaluated by the pull-out strength (Kg/2 cm) and the rubber coverage (%) on the surface of the steel cord so pulled out. The results are shown in Table 4. Table 4 also shows the combinations of the steel cords-covering rubber compositions and contiguous rubber compositions shown in Table 3.

TABLE 3

| Ingredient (Parts by weight) | Steel cords-covering rubber composition | | | | | | | | | Rubber composition contiguous to the steel cords-covering rubber composition | | | | | | | | | | |
|---|---|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 | 19 | 20 |
| Natural rubber | 100 | → | → | → | → | → | → | → | → | → | 60 | | | | | | | | | |
| Polybutadiene rubber | | | | | | | | | | | 40 | | | | | | | | | |
| Carbon black (HAF) | 50 | | | | | 55 | | | | | 55 | → | → | → | → | → | → | → | → | → |
| Zinc oxide | 9 | → | → | → | → | 10 | → | → | → | → | 3 | | | | | | | | | |
| Stearic acid | 0.5 | → | → | → | → | | | | | | | | | | | | | | | |
| Antioxidant[1] | 1 | | | | | | | | | | 2 | | | | | | | | | |
| Process oil | 2 | → | → | → | → | → | → | → | → | → | 3.5 | | | | | | | | | |
| Cobalt naphthenate | 2 | | | | | | | | | | | | | | | | | | | |
| Cobalt stearate | | | | | | 1 | → | → | → | | | | | | | | | | | |
| Meta-cresol resin *1 | | 0.5 | 1 | 4 | 10 | | 0.5 | 1 | 4 | | | 0.5 | 1 | 4 | 8 | | 5 | | 5 | |
| Sulfur | 5.5 | → | → | → | → | 6 | → | → | → | | 1.2 | → | → | → | → | → | → | → | → | → |
| Vulcanization accelerator OBS *2 | | | | | | 0.8 | → | → | → | | 1.2 | 0.6 | → | → | → | → | | | | |
| Vulcanization accelerator OZ *3 | 0.5 | → | → | → | → | | | | | | | | | | | | | | | |
| Vulcanization accelerator MBTS *4 | | | | | | | | | | | | 0.6 | → | → | → | → | 0.5 | 0.5 | 1.2 | |
| Vulcanization accelerator MBT *5 | | | | | | | | | | | | | | | | | | | 0.5 | 0.5 |

*1: SUMIKANOL produced by Sumitomo Chemical Co., Ltd.
*2: N—oxydiethylenebenzothiazylsulfenamide
*3: N,N'—dicyclohexylbenzothiazylsulfenamide
*4: Dibenzothiazyldisulfide
*5: Mercaptobenzothiazole

TABLE 4

| | Group | | | | | | | | | | |
|---|---|---|---|---|---|---|---|---|---|---|---|
| | Group I | | | | | | Group II | | | | |
| | Control Ex., Ex., and Comp. Ex. | | | | | | | | | | |
| No. | Control Ex. | Comp. Ex. | Ex. | Ex. | Ex. | Ex. | Control Ex. | Comp. Ex. | Ex. | Ex. | Ex. |

TABLE 4-continued

| | | | | | | | | | | | |
|---|---|---|---|---|---|---|---|---|---|---|---|
| Combination | 1 | 1 | 1 | 2 | 3 | 4 | 2 | 2 | 5 | 6 | 7 |
| Steel cords-covering rubber composition (No.) | 1 | 1 | 2 | 3 | 4 | 5 | 6 | 6 | 7 | 8 | 9 |
| Rubber composition contiguous to said steel cords-covering rubber composition (No.) | 10 | 11 | 11 | 11 | 11 | 11 | 10 | 11 | 11 | 11 | 11 |

Bond strength evaluation test, Pull-out strength (Kg/2 cm), Numerals in parentheses indicating rubber retention ratio.

| | | | | | | | | | | | |
|---|---|---|---|---|---|---|---|---|---|---|---|
| Cured soon after preparation of test samples | 37(93) | 37(95) | 37(95) | 38(94) | 36(95) | 32(95) | 38(95) | 37(93) | 37(95) | 36(90) | 38(90) |
| Cured 1 day after preparation of test samples | 38(94) | 32(62) | 32(70) | 35(85) | 35(92) | 34(95) | 37(92) | 31(53) | 32(72) | 34(85) | 36(90) |
| Cured 2 days after preparation of test samples | 36(95) | 25(25) | 28(45) | 32(70) | 33(90) | 32(92) | 38(90) | 25(33) | 27(31) | 27(40) | 34(84) |
| Cured 3 days after preparation of test samples | 37(95) | 18(8) | 23(30) | 27(44) | 31(75) | 32(95) | 39(94) | 19(14) | 20(14) | 25(35) | 31(74) |
| Cured 4 days after preparation of test samples | 35(93) | 20(10) | 16(7) | 15(2) | 18(20) | 32(90) | 39(95) | 20(17) | 20(15) | 21(20) | 25(39) |

| | Group III | | | | Group IV | | | Group V | Group VI | | Group VII | |
|---|---|---|---|---|---|---|---|---|---|---|---|---|
| | | | | | Control Ex., Ex., and Comp. Ex. | | | | | | | |
| | Ex. | Ex. | Ex. | Ex. | Comp. Ex. | Ex. | Ex. No. | Ex. | Comp. Ex. | Ex. | Ex. | Comp. Ex. | Ex. |
| Combination | 8 | 9 | 10 | 11 | 3 | 12 | 13 | 14 | 4 | 15 | 16 | 5 | 17 |
| Steel cords-covering rubber composition (No.) | 1 | 1 | 1 | 1 | 1 | 3 | 4 | 1 | 1 | 4 | 5 | 1 | 1 |
| Rubber composition contiguous to said steel cords-covering rubber composition (No.) | 12 | 13 | 14 | 15 | 16 | 16 | 16 | 17 | 18 | 18 | 18 | 19 | 20 |

Bond strength evaluation test, Pull-out strength (Kg/2 cm), Numerals in parentheses indicating rubber retention ratio.

| | | | | | | | | | | | | | |
|---|---|---|---|---|---|---|---|---|---|---|---|---|---|
| Cured soon after preparation of test samples | 35(95) | 36(92) | 37(92) | 39(90) | 37(94) | 36(94) | 37(95) | 36(95) | 34(92) | 34(95) | 32(94) | 35(85) | 36(90) |
| Cured 1 day after preparation of test samples | 34(85) | 34(95) | 34(92) | 33(91) | 31(65) | 32(88) | 34(92) | 34(93) | 23(27) | 32(28) | 33(89) | 35(50) | 34(85) |
| Cured 2 days after preparation of test samples | 32(77) | 37(90) | 36(91) | 34(88) | 27(26) | 31(75) | 33(92) | 34(92) | 14(10) | 29(60) | 31(77) | 20(20) | 30(60) |
| Cured 3 days after preparation of test samples | 25(39) | 29(54) | 30(66) | 32(73) | 20(15) | 28(50) | 31(77) | 31(70) | 12(5) | 23(30) | 29(56) | 10(0) | 25(50) |
| Cured 4 days after preparation of test samples | 13(11) | 19(17) | 26(35) | 26(45) | 12(10) | 14(4) | 24(31) | 27(49) | 10(0) | 14(10) | 24(30) | 10(0) | 25(30) |

Note:
Control Ex. = Control Example
Comp. Ex. = Comparative Example
Ex. = Example

(GROUP I)

In Group I, rubber compositions Nos. 1–5 for the steel cords-covering rubber layer and rubber compositions Nos. 10–11 for the contiguous rubber layer were used in combination as indicated in Table 4. The compositions Nos. 1–5 contained N,N'-dicyclohexylbenzothiazylsulfenamide (DZ) as the vulcanization accelerator and 0–10 parts by weight of the m-cresol resin per 100 parts by weight of the starting rubber material (natural rubber), respectively.

In Control Example 1, the rubber compositions Nos. 1 and 10 were used in combination. The resulting cured rubber products hardly exhibited a decrease in bond strength because of the absence of a thiazole type vulcanization accelerator in the composition No. 10 although the compositions were cured even after they had been left uncured for as long as 4 days. In Comparative Example 1, the resulting cured rubber products exhibited a decrease in bond strength even when the compositions had been left uncured for only one day prior to being cured since the contiguous rubber composition (No. 11) contained a thiazole type vulcanization accelerator (MBTS). The longer the rubber compositions (Nos. 1 and 11) were left uncured in contact with each other, the sharply lower bond strength the resulting cured rubber products exhibited.

In Examples 1–4, Nos. 2–5 (prepared by adding 0.5–10 parts by weight of the m-cresol resin to No. 1) were used as the steel-cords covering rubber composition and No. 11 containing MBTS was used as the contiguous rubber composition, respectively. These Examples show that with the increase in amount of the m-cresol resin used, a decrease in bond strength of the resulting cured rubber products can be prevented more effectively. FIG. 1 indicates the relationship of rubber coverage to the amount of m-cresol resin used and day or days for which rubber compositions are left uncured. It is seen from FIG. 1 that in a case where the m-cresol resin is used in a small amount, the longer the rubber compositions are left uncured, the lower the bond strength of the resulting cured rubber product is. On the other hand, in a case where the m-cresol resin is used in a large amount by weight of 10 parts as in Example 4, a decrease in bond strength of the resulting cured rubber product is hardly caused when cured after the rubber compositions are left uncured for a day or days. As is seen from the above, such a decrease in bond strength due to being left uncured will be prevented by adding a m-cresol resin to the steel cords-covering rubber composition in a case where the contiguous rubber composition contains a thiazole type vulcanization accelerator (MBTS).

(GROUP II)

In Group II, Nos. 6–9 were used as the steel cords-covering rubber compositions and Nos. 10–11 as the contiguous rubber compositions. Nos. 6–9 contained N-oxydiethylenebenzothiazylsulfenamide (OBS) as the vulcanization accelerator and 0–4 parts by weight of the m-cresol resin per 100 parts by weight of the rubber material (natural rubber).

In Group II as in Group I, the use of the m-cresol resin in the steel cords-covering rubber compositions could prevent a decrease in bond strength of the resulting cured rubber products.

(GROUP III)

In Group III, No. 1 was used as the steel cords-covering rubber composition and Nos. 12–15 were used as the contiguous rubber compositions containing the OBS and MBTS (vulcanization accelerators) and the m-cresol resin in amounts of 0.5–8 parts by weight per 100 parts by weight of the rubber material as shown in Table 4.

As is seen from the results in Table 4, a decrease in bond strength of the resulting cured rubber products could be prevented satisfactorily in Examples 8–11 as compared with Comparative Example 1 wherein the m-cresol resin was not used. FIG. 2 indicates the relationship between rubber coverage for cured rubber products and the times (day or days) for which rubber compositions for the cured products were left uncured in cases where the m-cresol resin was contained in the contiguous rubber compositions. As is seen from FIG. 2, a decrease in bond strength of the cured products due to the fact that the rubber compositions were left uncured could be prevented by having the m-cresol resin contained in the contiguous rubber compositions in cases where these contiguous compositions contained the thiazole type vulcanization accelerator (MBTS).

(GROUP IV)

In Group IV, Nos. 1, 3 and 4 were used as the steel cords-covering rubber compositions while No. 16 was used as the contiguous rubber composition. No. 16 contained MBTS as the single vulcanization accelerator but it did not contain the m-cresol resin.

In this case as well as in Group I, the rubber compositions in Examples 12 and 13 wherein the steel cords-covering rubber composition contained the m-cresol resin could be prevented from decreasing in bond strength when cured.

(GROUP V)

In Group V, No. 1 was used as the steel cords-covering rubber composition and No. 17 as the contiguous rubber layer containing the m-cresol resin and MBTS as the single vulcanization accelerator.

As in Group III, the rubber compositions in Example 14 could be satisfactorily prevented from decreasing in bond strength when cured as compared with those of Comparative Example 3 in which No. 16 containing no m-cresol was used as the contiguous rubber composition.

(GROUP VI)

In Group VI, Nos. 1, 3 and 4 were used as the steel cords-covering rubber compositions, while No. 18 was used as the contiguous rubber composition containing no m-cresol resin but a large amount of MBTS as the single vulcanization accelerator.

In this case as well as in Groups I and IV, as compared with the rubber composition obtained in Comparative Example 4 using no m-cresol resin therein, those obtained in Examples 15 and 16 each using therein the m-cresol resin-added steel cords-covering rubber composition could be prevented from decreasing in bond strength when cured.

(GROUP VII)

In this Gruop, No. 1 was used as the steel cords-covering rubber composition, while Nos. 19 and 20 were used as the contiguous rubber compositions. No. 19 contained no m-cresol resin but MBT as the single vulcanization cure accelerator, while No. 20 as well as No. 19 contained the m-cresol resin and MBT as the single vulcanization accelerator.

As compared with the rubber composition obtained in Comparative Example 5 using no m-cresol resin therein those obtained in Example 17 using the m-cresol resin therein could be prevented from decreasing in bond strength when cured.

As is seen from the above, in cases where a rubber composition (B) contiguous to a steel cords-covering rubber composition (A) contains a thiazole type vulcanization accelerator, the rubber compositions (A) and (B), when cured, will be able to be prevented from decreasing in strength of bond therebetween by having a m-cresol resin contained in at least one of the compositions (A) and (B) even if these compositions are left uncured in contact with each other for a long time. Thus, this invention is applicable particularly to the production of not only steel carcass-containing steel reinforced tires but also conveyor belts and the like.

What is claimed is:

1. In a composite comprising a rubber layer covering steel cords and a rubber layer contiguous to said steel cords-covering layer,
   the composite characterized in that:
   said contiguous rubber layer contains a thiazole type vulcanization accelerator in an amount of 0.05–2.0 parts by weight per 100 parts by weight of the rubber material and
   at least one member selected from said steel cords-covering rubber layer and said contiguous rubber layer contains a m-cresol resin in an amount of 0.5–10 parts by weight per 100 parts by weight of the rubber material.

2. A composite according to claim 1, wherein the m-cresol resin is a novolak type resin having a softening point of 80°–120° C. prepared by reacting m-cresol with formaldehyde or paraformaldehyde in the presence of an acid catalyst.

3. A composite according to claim 1 or 2, wherein the thiazole type vulcanization accelerator is mercaptobenzothiazole or dibenzothiazyl disulfide.

4. A composite according to claim 1 or 2, wherein the steel cords are those plated with brass, copper or a zinc alloy.

5. A composite according to claim 3, wherein the steel cords are those plated with brass, copper or a zinc alloy.

* * * * *